US008015320B2

(12) United States Patent
Sultan et al.

(10) Patent No.: US 8,015,320 B2
(45) Date of Patent: Sep. 6, 2011

(54) LOAD DISTRIBUTION AND REDUNDANCY USING TREE AGGREGATION

(75) Inventors: Robert Sultan, Somers, NY (US); Lucy Yong, McKinney, TX (US); Linda Dunbar, Plano, TX (US); T. Benjamin Mack-Crane, Downers Grove, IL (US)

(73) Assignee: Futurewei Technologies, Inc., Plano, TX (US)

( * ) Notice: Subject to any disclaimer, the term of this patent is extended or adjusted under 35 U.S.C. 154(b) by 331 days.

(21) Appl. No.: 12/197,962

(22) Filed: Aug. 25, 2008

(65) Prior Publication Data
US 2009/0063708 A1 Mar. 5, 2009

Related U.S. Application Data

(60) Provisional application No. 60/968,426, filed on Aug. 28, 2007.

(51) Int. Cl.
*G06F 15/16* (2006.01)
(52) U.S. Cl. .................................................. 709/252
(58) Field of Classification Search .................. 709/252
See application file for complete search history.

(56) References Cited

U.S. PATENT DOCUMENTS

| | | | | |
|---|---|---|---|---|
| 5,426,637 | A * | 6/1995 | Derby et al. | 370/401 |
| 6,343,077 | B1 * | 1/2002 | Chin et al. | 370/395.6 |
| 6,430,154 | B1 * | 8/2002 | Hunt et al. | 370/230.1 |
| 7,729,291 | B2 * | 6/2010 | Heino et al. | 370/254 |
| 2003/0023733 | A1 * | 1/2003 | Lingafelt et al. | 709/229 |
| 2007/0195701 | A1 * | 8/2007 | Menth et al. | 370/238 |
| 2007/0263554 | A1 * | 11/2007 | Finn | 370/256 |
| 2007/0263631 | A1 * | 11/2007 | Mallory | 370/394 |
| 2008/0107027 | A1 * | 5/2008 | Allan et al. | 370/235 |
| 2008/0247324 | A1 * | 10/2008 | Nadeau et al. | 370/245 |

OTHER PUBLICATIONS

IEEE Standard, 802.1D™, "IEEE Standard for Local and Metropolitan Area Networks, Media Access Control (MAC) Bridges," IEEE Computer Society, Jun. 9, 2004, 260 pages.
IEEE Standard, 802.1ad™, "IEEE Standard for Local and Metropolitan Area Networks, Virtual Bridged Local Area Networks, Amendment 4: Provider Bridges," IEEE Computer Society, May 26, 2006, 73 pages.
IEEE Standard, 802.1ag™, "IEEE Standard for Local and Metropolitan Area Networks, Virtual Bridged Local Area Networks, Amendment 5: Connectivity Fault Management," IEEE Computer Society, Dec. 17, 2007, 260 pages.

(Continued)

*Primary Examiner* — Jeffrey Pwu
*Assistant Examiner* — Shripal Khajuria
(74) *Attorney, Agent, or Firm* — Conley Rose, P.C.; Grant Rodolph (57) ABSTRACT

A network comprising a plurality of trees each comprising at least one ingress leaf node, at least one interior node, and at least one egress leaf node, wherein at least some of the ingress leaf nodes and the egress leaf nodes are common to the trees, and wherein the ingress leaf node is configured to transport data to the egress leaf node using any of the trees is disclosed. Also disclosed is a network component comprising a processor configured to implement a method comprising selecting one of a plurality of trees associated with information contained within a frame, directing the frame to the selected tree, and maintaining a filtering database (FDB) entry in an interior node in the unselected tree or trees.

21 Claims, 5 Drawing Sheets

OTHER PUBLICATIONS

IEEE P802.1ah/D4.2, "Draft Standard for Local and Metropolitan Area Networks, Virtual Bridged Local Area Networks, Amendment 6: Provider Backbone Bridges," IEEE Computer Society, Mar. 26, 2008, 116 pages.

IEEE Standard, 802.1Q™, "IEEE Standard for Local and Metropolitan Area Networks, Virtual Bridged Local Area Networks," IEEE Computer Society, May 19, 2006, 301 pages.

IEEE Standard, 802.1AX™/D0.9, "Draft Standard for Local and Metropolitan Area Networks Link Aggregation," IEEE Computer Society, Mar. 5, 2007, 177 pages.

Nortel Networks, "Eliminate Single Points of Failure," 2004, pp. 1-8.

Newman, David, "Cisco's Virtual Switch Smashes Throughput Records," Network World, Jan. 3, 2008, pp. 1-4.

Cisco, "Cisco Catalyst 6500 Series Virtual Switching System (VSS) 1440," Cisco Systems, Inc., 2008, pp. 1-80.

Yong, Lucy, et al., "Network Availability Enhancement Technique for Packet Transport Networks," filed Jun. 27, 2007 as U.S. Appl. No. 11/769,534.

* cited by examiner

LOAD DISTRIBUTION AND REDUNDANCY USING TREE AGGREGATION

CROSS-REFERENCE TO RELATED APPLICATIONS

The present application claims priority to U.S. Provisional Patent Application Ser. No. 60/968,426, filed Aug. 28, 2007 by Robert Sultan, et al. and entitled "System and Method of Load Distribution and Redundancy Using Tree Aggregation," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service providers may offer Ethernet-based connectivity to customers using the methods specified by Institute of Electrical and Electronics Engineers (IEEE) standard 802.1Q Virtual Local Area Network (VLAN) Bridging and its amendments, including IEEE 802.1ad Provider Bridging (PB) and IEEE 802.1ah Provider Backbone Bridging (PBB). IEEE 802.1Q specifies that the active components of a VLAN Bridged network must conform to a tree topology in order to avoid looping of frames. Such a tree topology may be maintained dynamically by a Spanning Tree Protocol (STP) or statically by provisioning or by the use of a network having a physical tree topology. A node that has only a single point of attachment to the tree (i.e., which lies at the edge of the tree) is called a leaf node. Any other node is called an interior node.

In the tree topology, data communications can be protected against link failures using the IEEE 802.3ad standard, also referred to as Link Aggregation. According to Link Aggregation, the data transported between two nodes is distributed among a plurality of links between those nodes, which are said to belong to a Link Aggregation Group (LAG). When a link fails, the data load assigned to that link can be reassigned or shifted to other available links in the LAG. Thus, Link Aggregation provides load distribution and protection against link failures without addressing node failures. Other methods have been proposed to support load distribution and to provide protection against both link and node failures. However, such methods may require establishing a virtual switch architecture, where the interior nodes are paired and interconnected via dedicated links or trunks to form a virtual interior node and hence provide redundancy against node or link failures. Accordingly, the interior node's functionality is modified or upgraded, which may not be desired by a service provider.

SUMMARY

In one embodiment, the disclosure includes a network comprising a plurality of trees each comprising at least one ingress leaf node, at least one interior node, and at least one egress leaf node, wherein at least some of the ingress leaf nodes and the egress leaf nodes are common to the trees, and wherein the ingress leaf node is configured to transport data to the egress leaf node using any of the trees.

In another embodiment, the disclosure includes a network component comprising selecting one of a plurality of trees associated with information contained within a frame, directing the frame to the selected tree, and maintaining a filtering database (FDB) entry in an interior node in the unselected tree or trees.

In a third embodiment, the disclosure includes a method comprising identifying a plurality of trees in communication with an egress leaf node, and sending a plurality of frames to the egress leaf node by distributing the frames among the trees.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are a TRAG network architecture and a TRAM for supporting load distribution across the portion of a network within the scope of the TRAG and providing protection against link and node failures within the scope of the TRAG. The TRAG may comprise a plurality of trees, each comprising a plurality of nodes connected in a tree topology. In an embodiment, the trees of the TRAG are connected to common leaf nodes while being disjoint at the interior nodes. Hence, the redundancy of the network may be improved by modifying the leaf nodes without modifying the interior nodes. The TRAM may comprise distributing data loads across the trees in the TRAG by hashing on the source media access control (MAC) address (SA), destination MAC address (DA), combination of SA and DA, or any other fields in the frame that may serve to identify a flow at a TRAG ingress leaf node. The data may then be transported across the trees in a connectionless manner. If a link or node failure is detected in one tree, then the load assigned to that tree may be reassigned to at least one other tree. Additionally, a plurality of FDB entries may be refreshed in at least some of the interior nodes using special control frames to prevent or reduce network flooding in the case of link or node failures.

Figure 1:
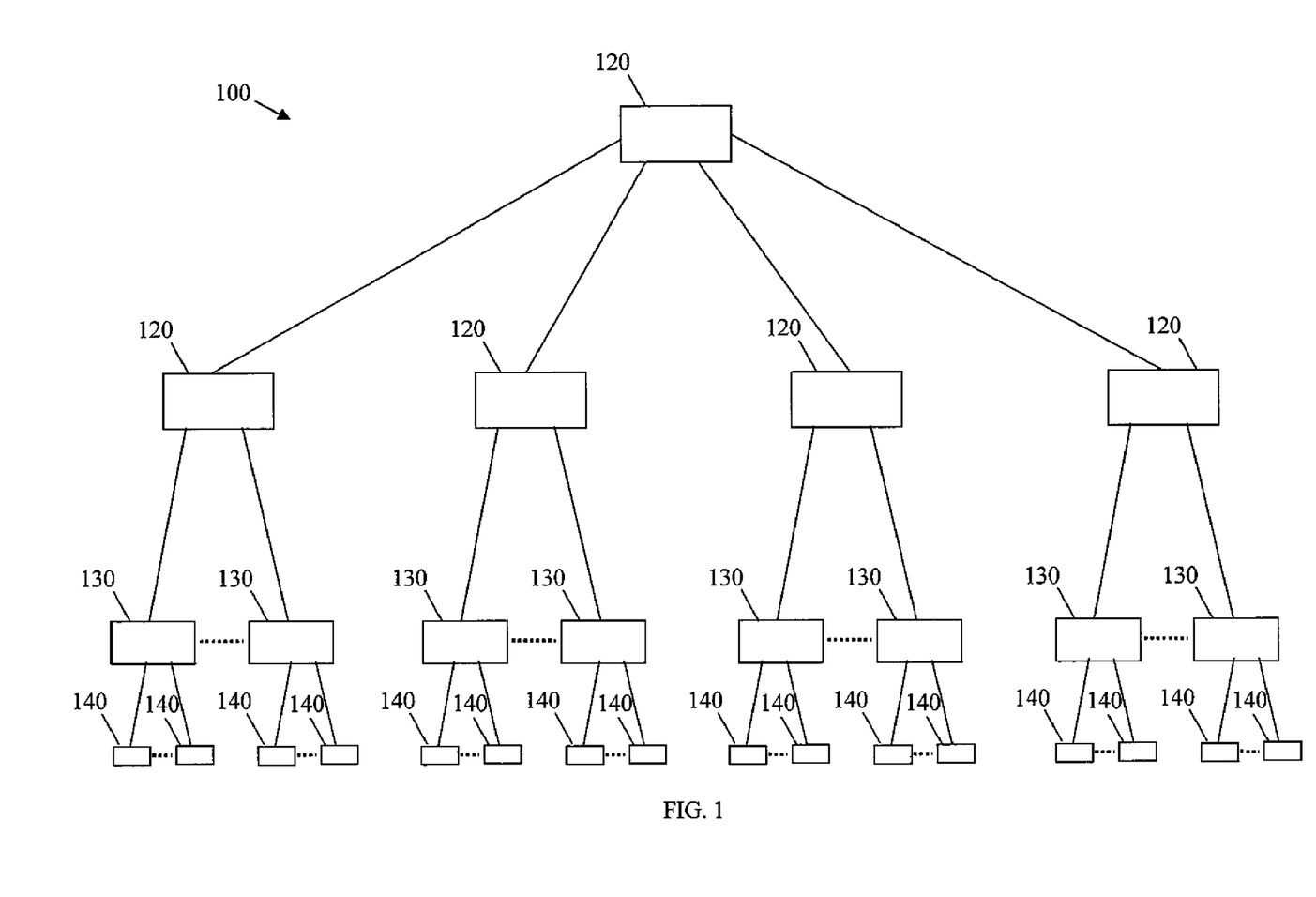
FIG. 1 is a schematic diagram of an embodiment of a tree network architecture.

FIG. 1 illustrates one embodiment of a tree network architecture 100. The tree network architecture 100 comprises a plurality of interior nodes 120 in communication with a plurality of leaf nodes 130 as shown in FIG. 1. The leaf nodes 130 may in turn be in communication with a plurality of end-stations 140. While the tree network architecture 100 in FIG. 1 is symmetrical, the tree network architecture 100 may also be asymmetrical. The network may utilize the IEEE 802.1D Bridging protocol, the IEEE 802.1Q VLAN Bridging protocol, the IEEE 802.1ad Provider Bridging protocol, the IEEE 802.1ah Ethernet Backbone Bridging Protocol, or other suitable protocols.

The tree network architecture 100 may comprise at least one interior node 120. An interior node 120 may be connected to at least one leaf 130 node via point-to-point links and may be connected to one or more other interior nodes 120 via point-to-point links. These links may be electrical, optical, wireless, or other type of communications link. Communications within the network flow from one leaf node 130 to another leaf node 130 via some sequence of interior nodes 120. As such, each leaf node 130 may be coupled to at least one end-station node 140 that originates (sources) or receives (sinks) data frames. Further, the leaf nodes 130 may be at the edge of the network or may be part of the interior of the network.

The interior nodes 120 and leaf nodes 130 may comprise an IEEE 802.1D or IEEE 802.1Q Bridging device or other device or component configured to transport frames between a source end-station node 140 and a destination end-station node 140. Such devices typically contain a plurality of ingress ports for receiving frames from other nodes, logic circuitry to determine which port or ports on which the forward frames, and a plurality of egress ports for transmitting frames. In an embodiment, the interior nodes 120 and leaf nodes 130 make the determinations needed to transport the frames through the network at Open System Interconnection (OSI) layer two.

The load transported between a source end-station node 140 and a destination end-station node 140 may comprise frames, such as Ethernet frames or any similar information structure. In embodiments, the identifier may include a SA, a DA, or both. Additionally, the identifier may include a tag protocol identifier (TPID) and a VLAN identifier (VID) as defined by IEEE 802.1Q.

Figure 2:
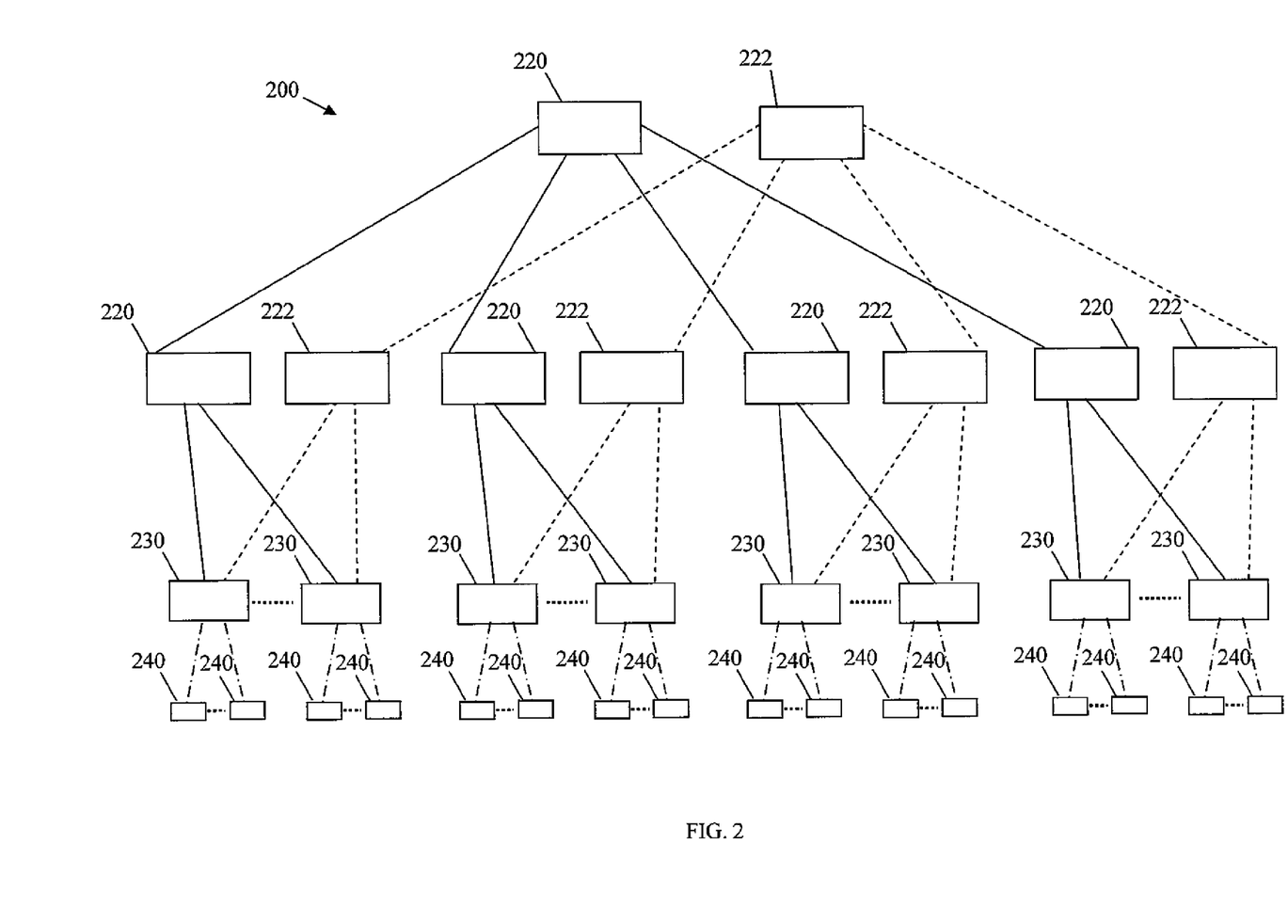
FIG. 2 is a schematic diagram of an embodiment of a tree aggregation group (TRAG) network architecture.

FIG. 2 illustrates an embodiment of a TRAG network architecture 200, which may be established for networks that support a tree network architecture, such as the tree network architecture 100. The TRAG network architecture 200 may comprise a plurality of trees each configured similar to that of the tree network architecture 100. Each tree may comprise the same number of levels and the same number of nodes at each level as shown in FIG. 2, or they may have different numbers of levels and nodes. In an embodiment, the trees are disjoint, that is they may not share any common nodes except at the leaf node level. As such, at least some and preferably all of the leaf nodes are common to the set of trees, while the interior nodes corresponding to the different trees are disjoint.

For instance, the TRAG network architecture 200 may comprise two trees, as shown in FIG. 2. The first tree (represented by the solid lines) may comprise a first interior node 220 at the top-level connected to a plurality of interior nodes 220 at a second level via point-to-point links. In turn, each first interior node 220 may be connected to a plurality of leaf nodes 230 at a third level via point-to-point links. Similarly, the second tree (represented by the dashed lines) may comprise a second top-level interior node 212 connected to a plurality of interior nodes 222 at the second level via point-to-point links. In turn, each second interior node 222 may be connected to a plurality of leaf nodes 230 at the third level via point-to-point links. In addition, the leaf nodes 230 are in communication with a plurality of end-station nodes 240 (represented by the dashed and dotted lines). In an embodiment, each interior node of the first tree 220 is disjoint from the corresponding interior node of the second tree 222, and each leaf node 230 of the first tree is common with each leaf node 230 of the second tree.

The source and destination end-station nodes 240, identified by SA or DA, are below the leaf nodes 230. Specifically, each leaf node 230 may have one or more of end-station nodes 240 associated with it. Each leaf node 230 may perform the functions of an ingress leaf node or an egress leaf node with respect to frames passing through that node. As used herein, the ingress and egress leaf nodes may be defined as nodes that are connected to a plurality of trees. A leaf node performs the leaf ingress function when the leaf node transmits a frame towards or into the TRAG. A leaf node performs the leaf egress function when the leaf node transmits a frame away from the TRAG.

In an embodiment, the data frames may be transported between the source end-station 240 and destination end-station 240 via the nodes associated with a single tree, similar to the forwarding scheme of a tree network architecture, such as the tree network architecture 100. For example, the data frames may be forwarded via the first tree along a route illustrated by the solid lines comprising two leaf nodes 230, two second-level interior nodes 220, and one top-level interior node 220. Alternatively, the data frames may be forwarded via the second tree along a route illustrated by the dashed lines comprising the same two leaf nodes 230, two second-level interior nodes 222, and the top-level interior node 222. In another embodiment, the load of one leaf node 230 may be distributed or forwarded along more than one tree. For example, some of the frames may be forwarded via the first tree along a route comprising two leaf nodes 230 and three interior nodes 220, while the remaining frames may be forwarded via the second tree along a route comprising the same two leaf nodes 230 and three interior nodes 222. Specifically, an ingress leaf node may direct frames associated to one or another of the trees based on the identity of a flow associated with the frames. The flow may be identified by performing a hash function on particular fields associated with the frame including, but not limited to, the SA and/or DA. For example, an ingress leaf node may receive frames from four ingress end-stations 240, each identified by an SA. In such a case, the leaf node may send the frames from the first two end-stations 240 to the tree indicated by the solid lines and the frames from the last two end-stations 240 to the tree indicated by the dashed lines. As such, the TRAG network architecture 200 may provide load distribution to increase the network bandwidth capability, improve network availability or resilience to link or node failures, or both.

When a node or link associated with one tree fails, at least some of the data frames may be redirected by the ingress leaf node to another tree. For example, when a point-to-point link in the first tree fails, the load assigned to the first tree may be transferred to the second tree. Alternatively, the load for the first tree may be distributed over a plurality of trees when there are at least three trees.

Figure 3:
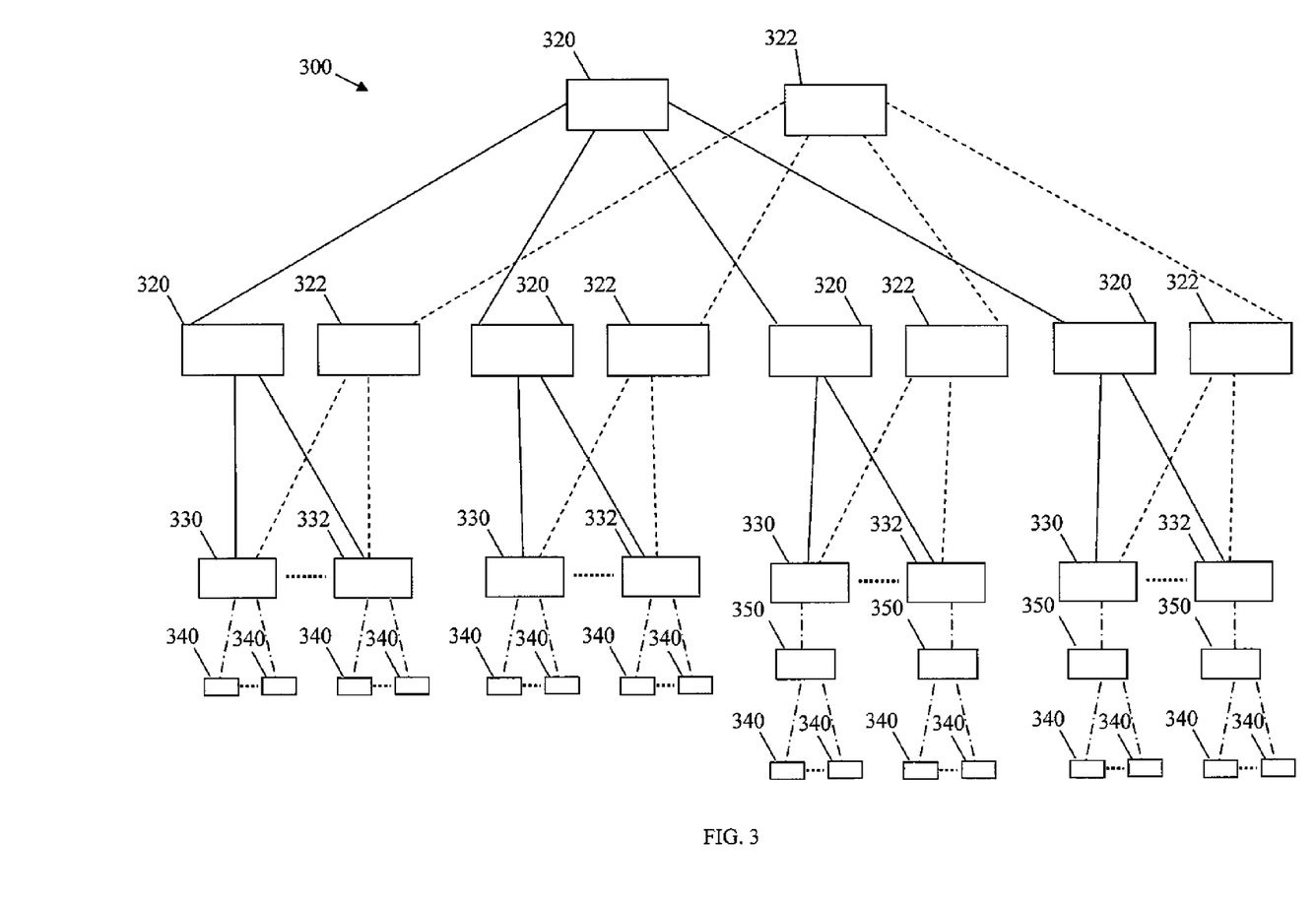
FIG. 3 is a schematic diagram of an embodiment of a TRAG network architecture in which the TRAG does not extend to all bridging devices within the network.

FIG. 3 illustrates another embodiment of a TRAG network architecture 300. Similar to the TRAG network architecture 200, the TRAG network architecture 300 may comprise a plurality of trees. However, the TRAG in FIG. 3 does not include all nodes in the physical tree topology. In particular, the nodes 350 of the physical topology are not included in the TRAG. Specifically, the first tree may comprise interior nodes 320 and leaf nodes 330. The second tree may comprise interior nodes 322 and leaf nodes 332. Non-TRAG nodes 350 perform frame forwarding and are part of the network, but are not associated with disjoint trees as in the case of TRAG nodes. In such a case, the eight end-station nodes 350 on the right side of FIG. 3 forward frames to non-TRAG nodes 350 which, in turn, forward the frames to leaf nodes 330 or 332 and thence to interior nodes 320 or 322 as appropriate.

In an embodiment of the TRAG network architecture, at least some of nodes may comprise a Filtering Database (FDB). The nodes may use the FDB entries to forward the frames received from the direction of an ingress leaf along one of the trees towards the egress leaf node. For instance, the FDB may comprise a plurality of entries, each consisting of a MAC address and VID and an associated egress port. In an embodiment, the ingress leaf node may match the received frames' DA and VID to one of the table entries and forward the frames via the associated port. The FDB may be populated by analyzing a frame's SA and VID and associating that MAC address with the port on which the frame was received. When frames associated with a particular source end-station, identified by an SA, are not directed on a given tree, then the FDB of nodes along that given tree will not contain an FDB entry associated with that MAC address. If a failure occurs in a node or link of some other tree in the TRAG, then traffic will be redirected to the given tree. If the redirected traffic references the unlearned MAC address as a destination address, then frames will be flooded until the MAC address is learned. This is likely to occur for many MAC address values, and excess flooding will result in network disruption. Specifically, if the ingress leaf node hashes frames based on their SA, then each tree will only receive a portion of the SAs associated with the ingress leaf node and the FDB entries in the other trees will age out. For instance, the node's FDB may not comprise a particular MAC address if it has not been received within the previous ten minutes. As such, the node's FDB entries may not comprise the forwarding information needed to forward the frames to the egress leaf node when the load from the failed tree is redistributed. Hence, the nodes on the reassigned tree may forward the frames to all the egress ports, i.e., flood the connected nodes with traffic, to guarantee that a copy of the frames is received by the appropriate node. Flooding the nodes with traffic may consume additional bandwidth and resources in the network, which may lead to network traffic congestion or other connectivity problems. As such, the ingress leaf node may periodically send a TRAG control frame (TCF) on the various trees to maintain the FDB entries. The egress leaf node may drop the TCF upon receipt.

The TCF may comprise the same MAC header as the data frames, e.g. it has the same SA and DA, but does not comprise the payload. Each time the ingress leaf node transmits a data frame on one of the trees, it may forward a TCF along the other trees comprising the TRAG, thereby refreshing the FDB entries in the nodes along the trees on which the data frame is not being sent. However, this may increase the amount of control traffic in the network. Alternatively, the ingress leaf node may forward the TCF with some probability, P. Specifically, the ingress leaf node may use a probability generator to determine whether to send a TCF to the trees (e.g., those trees upon which the frame was not sent) when each frame is processed. The value of P may be between zero and one and may be adjusted to increase or decrease the likelihood and/or frequency with which TCFs are sent to the various paths. Higher probabilities increase the likelihood that a given FDB entry will be present, and therefore reduce the likelihood of subsequent flooding, but at the expense of additional control traffic. Conversely, decreased probabilities reduce control traffic, but increase the likelihood of flooding.

Alternatively, the ingress leaf node may forward the TCF at a frame frequency that is preset with respect to the number of forwarded frames along the assigned tree. For example, the ingress leaf node may forward one TCF every about 100, about 1,000, or about 10,000 transmitted data frames. Such rates may be based on the data rates such that the TCFs reach the various nodes' FDBs prior to the FDBs' internal aging or expiration time. Alternatively, the ingress leaf node may forward the TCF at a time frequency. For example, the ingress leaf node may preset a timer to a predetermined time period, and forward the TCF each time the timer expires. The predetermined time period may be less than or equal to about the FDBs internal aging or expiration time. The process may be repeated as long as the data frames are being forwarded along the assigned tree.

Frames traversing a VLAN Bridging device are normally forwarded on a port or ports determined by a lookup of DA and VID fields of the frame. The result of the lookup is an outbound port. In the case that the frame is forwarded on a TRAG, the result of the lookup is a 'TRAG Port'. The TRAG port is a logical port rather than a distinct physical port. Similarly, when a frame is received, the port on which it arrived is associated with the DA and VID it contains. When the frame arrives via a physical port associated with a TRAG, the logical TRAG port that is learned and installed in the FDB. Thus, when a frame is to be forwarded on the TRAG, and a function (e.g., hashing function) is applied to fields in the frame to identify the particular tree on which the frame is to be forwarded, this operation can be viewed alternatively as the mapping of a logical TRAG port to a physical Bridge Port.

Where an interior node of a tree represents a VLAN Bridging device, the device forwards traffic associated with a particular VLAN only on those ports associated with the VID carried by a frame. The bridges receive VLAN membership information via a MAC Address Registration Protocol (MRP) VLAN Registration Protocol (MVRP). When the interior nodes of TRAG member trees are disjoint from one another, an interior node in one tree maintains the same forwarding associations as the corresponding interior node in another tree. This may be accomplished by forwarding an MVRP message to be transmitted on the TRAG port on the physical port associated with each of the member trees. In this way, the VLAN port membership list will be the same for corresponding interior nodes of different trees of the TRAG.

Figure 4:
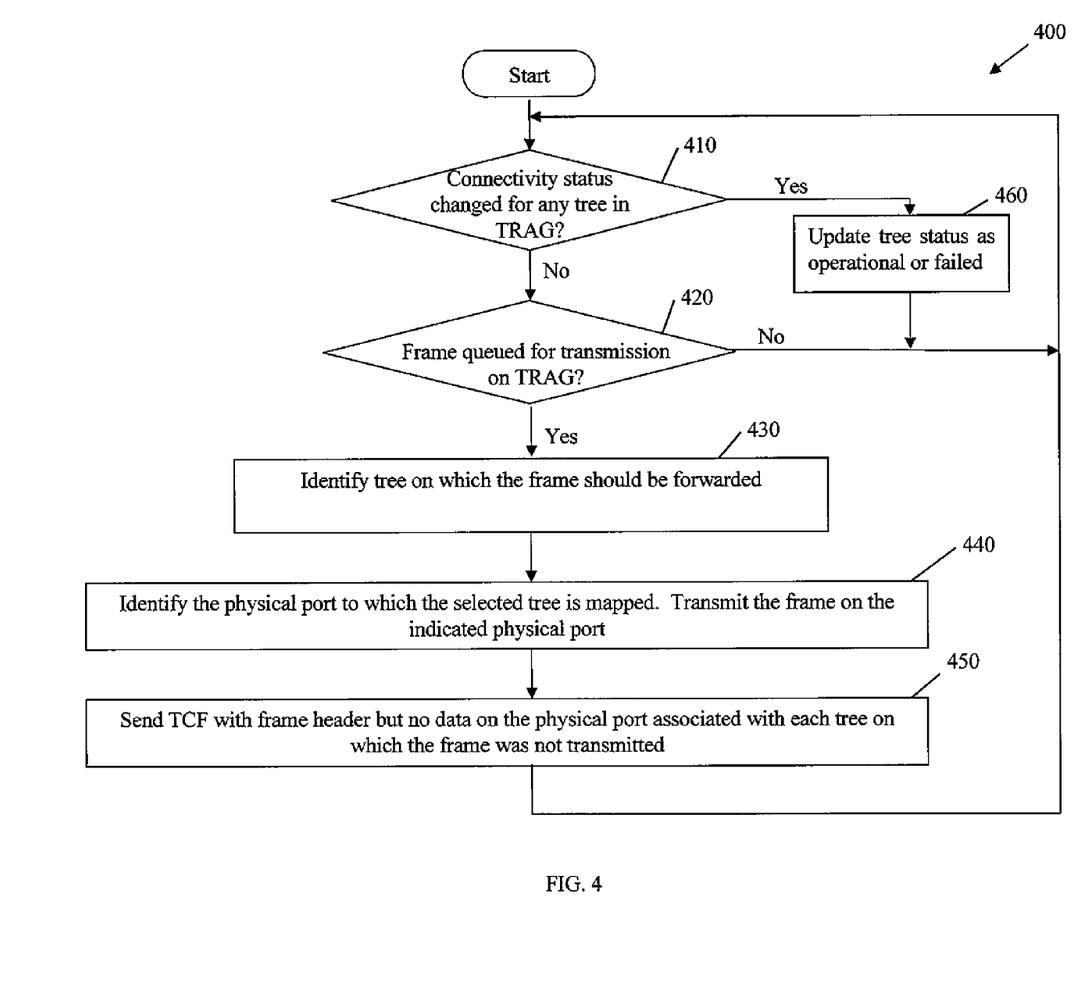
FIG. 4 is a flowchart diagram of an embodiment of a tree aggregation method (TRAM).

FIG. 4 illustrates an embodiment of a TRAM 400 for handling rerouting and forwarding of frames in a TRAG. The TRAM 400 may be implemented to distribute the load among a plurality of paths corresponding to a plurality of trees in the TRAG. Additionally, the TRAM 400 may maintain the FDB entries by sending a TCF from the ingress leaf nodes of the trees. When a link or node in a tree fails, and the frames are forwarded via an alternative tree, flooding may be reduced or substantially eliminated by using the TCF to maintain FDB entries.

At block 410, the TRAM 400 may determine whether the status of any tree has changed since the last time such a check was made. The status is determined based on a connectivity check performed distinctly on each tree using the methods specified by IEEE 802.1ag Connectivity Fault Management (CFM). At block 460, a data structure representing each of the trees is updated with a marking indicating whether that tree is operational or failed based on the status change detected at block 410. At block 420, it determined whether a frame is waiting to be sent on the logical port associated with the TRAG. If not, processing returns to block 410, otherwise processing proceeds to block 430.

At block 430, the TRAM 400 determines the tree on which the frame should be forwarded. For example, a hash function is applied to specified fields of the frame. The result of the hash identifies the tree on which the frame is to be forwarded. If the selected tree is not operational, then a second hash function is applied that re-associates the frame with an operation tree. At block 440, the TRAM 400 identifies the physical port to which the selected tree is mapped. The TRAM 400 then sends the frame on the physical port associated with the selected tree.

At block 450, the TRAM 400 may optionally send at least one TCF along one or a plurality of backup trees. For example, the TCF may be sent according to any of the methods described herein. The TRAM 400 may use the TCF to update or refresh the forwarding information at the nodes' FDBs along the backup tree or trees. The TCF may be received at the nodes along the trees and may be used to update the FDBs entries. Accordingly, the nodes' FDBs that receive the TCF at a higher rate, for example at every about 100 forwarded data frames or at a probability of 90 percent (P=0.9), may be updated more frequently than the nodes' FDBs that receive the TCF at a lower rate, for example at every about 1,000 forwarded data frames or at a probability of 20 percent (P=0.2). As such, the possibility of having the FDBs at the backup path updated at any instance or at the instance of detecting a failed primary assigned tree may increase as the frequency of forwarding the TCF is increased. However, increasing sending the TCFs and updating the nodes° FDBs along backup trees more frequently may increase the amount of network control traffic.

Figure 5:
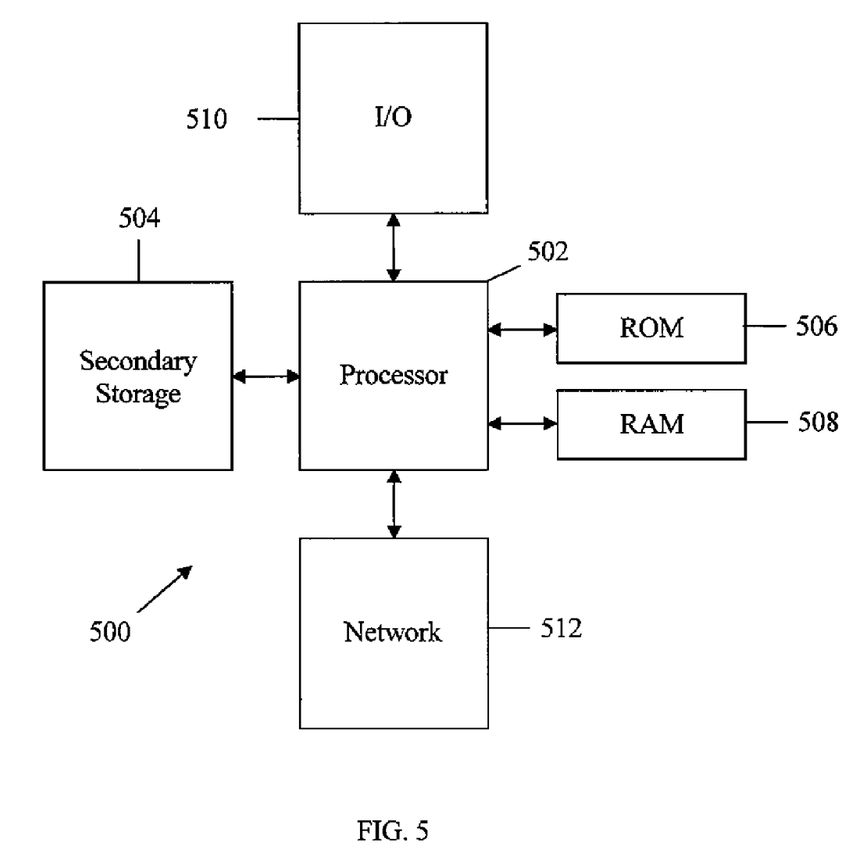
FIG. 5 is a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network comprising: a plurality of trees each comprising at least one ingress leaf node, a plurality of interior nodes, and at least one egress leaf node, wherein the interior nodes of each tree are completely disjoint from each other, wherein at least some of the ingress leaf nodes and the egress leaf nodes are common to the trees, wherein the ingress leaf node is configured to transport data to the egress leaf node using any of the trees, wherein a leaf node sends a plurality of data packets associated with a Source Address (SA) on a selected tree but not on an unselected tree, wherein the leaf node periodically sends an Ethernet packet that lacks a data payload on the unselected tree, thereby causing the unselected tree to maintain a Filtering Database (FDB) entry corresponding to the SA, wherein the unselected tree does not receive any data packets associated with the FDB entries before receiving the non-data packet, and wherein at least some of the nodes are Ethernet bridges.

2. The network of claim 1, wherein the ingress leaf nodes are in communication with a plurality of source end-stations, and wherein the egress leaf nodes are in communication with a plurality of destination end-stations.

3. The network of claim 1, wherein the data associated with one tree is transported from the ingress leaf node to the egress leaf node via at least one other tree when the one tree experiences a link or node failure.

4. The network of claim 1, wherein the data associated with one tree is transported from the ingress leaf node to the egress leaf node via at least one other tree when the one tree experiences a link or node failure.

5. The network of claim 1, wherein there is no synchronization between interior nodes.

6. The network of claim 1, wherein the network is an IEEE 802.1D Bridged Network, an IEEE 802.1Q VLAN Bridged Network, an IEEE 802.1ad Provider Bridged Network, or an IEEE 802.1ab Provider Backbone Bridged Network.

7. A network component comprising: a processor configured to: select one of a plurality of trees associated with a frame; direct the frame to the selected tree; and maintain a Filtering Database (FDB) entry in an interior node in the one or more unselected trees, wherein maintaining the FDB entry comprises sending a control frame on the one or more unselected-trees, and wherein the control frame comprises a Media Access Control (MAC) header but lacks a data payload.

8. The network component of claim 7, wherein the control frame is sent on the one or more unselected trees periodically, and wherein a frequency with which the control frame is sent is determined using a probability.

9. The network component of claim 7, wherein the control frame is sent on the one or more unselected trees periodically, wherein a frequency with which the control frame is sent is determined using a timer or a counter, and wherein the timer or the counter has an interval that is less then or about equal to an aging interval of the FDB.

10. The network component of claim 7, wherein the frame comprises the MAC header and a payload.

11. The network component of claim 7, wherein sending the control frame on the one or more unselected trees comprises sending the control frame on both a first unselected tree and a second unselected tree, wherein the first unselected tree is associated with a first probability and the second unselected tree is associated with a second probability that is lower then the first probability and wherein the processor is further configured to direct a second frame comprising the MAC header and payload down the selected tree; determine whether to updated a first FDB entry in the first unselected tree and a second FDB entry in the second unselected tree based on the first probability and the second probability, respectively, and responsive to the determination, send the second control frame down the first unselected tree without sending the second control frame down the second unselected tree, wherein the second control frame comprises the MAC header but lacks a data payload.

12. A method comprising: identifying, by an Ethernet bridge, a plurality of trees in communication with an egress leaf node, wherein the trees comprise a plurality of Ethernet nodes; selecting at least one but not all of the trees; sending a plurality of frames associated with a Source Address (SA) to the egress leaf node by distributing the frames over the selected trees; and maintaining a Filtering Database (FDB) entry corresponding to the SA in each unselected tree by sending a control frame to each unselected tree, wherein the control frames each comprise a Media Access Control (MAC) header but lack a data payload.

13. The method of claim 12, wherein the frames are forwarded by the trees in a connectionless manner.

14. The method of claim 12, wherein either the trees do not extend to all nodes in the network, or at least some of the egress leaf nodes are not adjacent to any end-stations.

15. The method of claim 12, wherein a logical tree aggregation group (TRAG) port is maintained as an outbound port entry in an a-FDB, wherein the logical TRAG port is later translated to a physical bridge port associated with a specific tree for purposes of frame forwarding, and wherein a logical TRAG port is learned based on a second frame having been received on a physical port associated with one of the trees.

16. The method of claim 12, wherein a MAC Address Registration Protocol (MRP) virtual local area network (VLAN) Registration Protocol (MVRP) message to be sent on the logical tree aggregation group (TRAG) port is forwarded on the physical port associated with each tree associated with the TRAG.

17. The method of claim 12, wherein the frames associated with the SA comprise the MAC header and a data payload.

18. The method of claim 17, wherein the unselected trees do not receive any frames comprising the MAC header data that are associated with the SA within a predetermined time period before receiving the control frame, wherein the predetermined time period is about: equal to a filtering database (FDB) aging interval.

19. The method of claim 12, wherein each of the trees comprise a plurality of interior nodes, and wherein the interior nodes of at least one of the trees are disjoint from a plurality of interior nodes in each of the other trees.

20. The network component of claim 7, wherein the control frame is an Ethernet frame that lacks an Ethernet payload.

21. The method of claim 12, wherein the control frames are Ethernet frames that lack an Ethernet payload.

* * * * *

UNITED STATES PATENT AND TRADEMARK OFFICE
CERTIFICATE OF CORRECTION

PATENT NO.        : 8,015,320 B2
APPLICATION NO.   : 12/197962
DATED             : September 6, 2011
INVENTOR(S)       : Robert Sultan et al.

It is certified that error appears in the above-identified patent and that said Letters Patent is hereby corrected as shown below:

IN THE CLAIMS:

Claim 4 should read: The network of claim 1, wherein the links between the ingress leaf nodes, the interior nodes, and the egress leaf nodes are fixed.

Claim 9 should read: The network component of claim 10, wherein the control frame is sent on the one or more unselected trees periodically, wherein a frequency with which the control frame is sent is determined using a timer or a counter, and wherein the timer or the counter has an interval that is less than or about equal to an aging interval of the FDB.

Claim 11 should read: The network component of claim 10, wherein sending the control frame on the one or more unselected trees comprises sending the control frame on both a first unselected tree and a second unselected tree, wherein the first unselected tree is associated with a first probability and the second unselected tree is associated with a second probability that is lower than the first probability, and wherein the processor is further configured to: direct a second frame comprising the MAC header and a payload down the selected tree; determine whether to update a first FDB entry in the first unselected tree and a second FDB entry in the second unselected tree based on the first probability and the second probability, respectively, and
responsive to the determination, send the second control frame down the first unselected tree without sending the second control frame down the second unselected tree, wherein the second control frame comprises the MAC header but lacks a data payload.

Claim 15 should read: The method of claim 16, wherein a logical tree aggregation group (TRAG) port is maintained as an outbound port entry in an FDB, wherein the logical TRAG port is later translated to a physical bridge port associated with a specific tree for purposes of frame forwarding, and wherein a logical TRAG port is learned based on a second frame having been received on a physical port associated with one of the trees.

Signed and Sealed this
Thirteenth Day of March, 2012

David J. Kappos
*Director of the United States Patent and Trademark Office*

Claim 18 should read: The method of claim 24, wherein the unselected trees do not receive any frames comprising the MAC header within a predetermined time period before receiving the control frame, wherein the predetermined time period is about equal to a filtering database (FDB) aging interval.

UNITED STATES PATENT AND TRADEMARK OFFICE
CERTIFICATE OF CORRECTION

PATENT NO. : 8,015,320 B2
APPLICATION NO. : 12/197962
DATED : September 6, 2011
INVENTOR(S) : Robert Sultan et al.

It is certified that error appears in the above-identified patent and that said Letters Patent is hereby corrected as shown below:

IN THE CLAIMS:

Column 8, lines 45-48, Claim 4 should read: The network of claim 1, wherein the links between the ingress leaf nodes, the interior nodes, and the egress leaf nodes are fixed.

Column 9, lines 1-6, Claim 9 should read: The network component of claim 10, wherein the control frame is sent on the one or more unselected trees periodically, wherein a frequency with which the control frame is sent is determined using a timer or a counter, and wherein the timer or the counter has an interval that is less than or about equal to an aging interval of the FDB.

Column 9, lines 9-25, Claim 11 should read: The network component of claim 10, wherein sending the control frame on the one or more unselected trees comprises sending the control frame on both a first unselected tree and a second unselected tree, wherein the first unselected tree is associated with a first probability and the second unselected tree is associated with a second probability that is lower than the first probability, and wherein the processor is further configured to: direct a second frame comprising the MAC header and a payload down the selected tree; determine whether to update a first FDB entry in the first unselected tree and a second FDB entry in the second unselected tree based on the first probability and the second probability, respectively, and
responsive to the determination, send the second control frame down the first unselected tree without sending the second control frame down the second unselected tree, wherein the second control frame comprises the MAC header but lacks a data payload.

Column 10, lines 6-12, Claim 15 should read: The method of claim 16, wherein a logical tree aggregation group (TRAG) port is maintained as an outbound port entry in an FDB, wherein the logical TRAG port is later translated to a physical bridge port associated with a specific tree for purposes of frame forwarding, and wherein a logical TRAG port is learned based on a second frame having been received on a physical port associated with one of the trees.

This certificate supersedes the Certificate of Correction issued March 13, 2012.

Signed and Sealed this
Third Day of April, 2012

David J. Kappos
*Director of the United States Patent and Trademark Office*

Column 10, lines 21-26, Claim 18 should read: The method of claim 24, wherein the unselected trees do not receive any frames comprising the MAC header within a predetermined time period before receiving the control frame, wherein the predetermined time period is about equal to a filtering database (FDB) aging interval.